US006583384B2

(12) United States Patent
Tenaglia et al.

(10) Patent No.: US 6,583,384 B2
(45) Date of Patent: Jun. 24, 2003

(54) UV CURABLE OVERLAYS FOR LASER SHOCK PROCESSING

(75) Inventors: Richard D. Tenaglia, Columbus, OH (US); Jeff L. Dulaney, Dublin, OH (US); Allan H. Clauer, Worthington, OH (US)

(73) Assignee: LSP Technologies, Inc., Dublin, OH (US)

( * ) Notice: Subject to any disclaimer, the term of this patent is extended or adjusted under 35 U.S.C. 154(b) by 0 days.

(21) Appl. No.: 09/911,070

(22) Filed: Jul. 23, 2001

(65) Prior Publication Data

US 2003/0015508 A1 Jan. 23, 2003

(51) Int. Cl.$^7$ .............................. B23K 26/00; B05D 5/06
(52) U.S. Cl. .................................. 219/121.85; 427/554
(58) Field of Search ........................... 219/121.6–121.85

(56) References Cited

U.S. PATENT DOCUMENTS

| | | | | |
|---|---|---|---|---|
| 5,127,019 A | * | 6/1992 | Epstein et al. ............... 372/108 |
| 5,131,957 A | * | 7/1992 | Epstein et al. ............... 148/565 |
| 5,316,720 A | * | 5/1994 | Spiegel et al. ................. 419/48 |
| 5,571,575 A | * | 11/1996 | Takayanagi .................... 427/9 |
| 5,741,559 A | * | 4/1998 | Dulaney ..................... 427/554 |
| 5,851,328 A | * | 12/1998 | Kohan ........................ 156/102 |
| 5,932,120 A | * | 8/1999 | Mannava et al. ...... 219/121.85 |
| 6,057,003 A | * | 5/2000 | Dulaney et al. ............. 427/457 |

* cited by examiner

Primary Examiner—Tom Dunn
Assistant Examiner—Zidia Pittman

(57) ABSTRACT

The invention, in another form thereof, comprises a method of laser shock peening the surface of a solid material with or without the use of a transparent overlay material. An energy absorbing coating is applied to a portion of the surface of a solid material. An ultraviolet-curable resin coating is applied to the energy absorbing coating and the curable resin is exposed to an ultraviolet light and forms a pellicle over the energy absorbing coating. A pulse of coherent energy is directed to the energy absorbing coating of the solid material to create a shock wave.

47 Claims, 2 Drawing Sheets

UV CURABLE OVERLAYS FOR LASER SHOCK PROCESSING

This invention was made with United States Government support under Contract No. F33615-00-C-5304 awarded by the Department of the Air Force. The United States Government has certain rights to this invention.

BACKGROUND OF THE INVENTION

1. Field of the Invention

The present invention relates to the use of coherent energy pulses, as from high powered pulsed lasers, as well as an ultraviolet curable resin and an ultraviolet light in the shock processing of materials, and, more particularly, to methods and apparatus for improving properties of solid materials by providing shock waves therein. The invention is especially useful for enhancing or creating desired physical properties such as hardness, strength, and fatigue strength.

2. Description of the Related Art

Laser peening (hereinafter referred to as laser shock processing) utilizes two overlays, a transparent overlay (usually water), and an opaque overlay (previously a black paint). During processing, a laser is directed to pass through the water overlay and is absorbed by the black paint, causing a rapid vaporization of the paint surface and the generation of a high-amplitude shock wave. The shock wave cold works the surface of the part creating compressive residual stresses, which provide an increase in fatigue properties of the part. A workpiece is typically processed by processing a matrix of overlapping spots that cover fatigue critical zones of the part.

The current art utilizing laser shock processing has a problem with the amount of time necessary to dry the black paint. The problem with drying the black paint usually occurs with solvent-based paint but other types of paint may have this problem. Another problem is that the black paint begins eroding as soon as the water layer is applied to the paint. This problem with erosion usually occurs with water-based paint but other types of paint may have this problem. During the laser processing of a workpiece, the black paint must be applied to the workpiece multiple times. Each coat of paint takes approximately ten minutes to dry, which makes the processing time lengthy. Also, once the transparent overlay is applied to the paint, the paint may start to erode immediately. This opaque layer erosion causes a turbulence in the surface of the workpiece and reduces the shock pressure during the laser shock processing cycle. Therefore, the paint must be applied again to the workpiece further increasing the processing time. This problem with erosion of the paint decreases the efficiency and effectiveness during the laser shock processing of the workpiece. The reasons for the efficiency and effectiveness being decreased is because of the amount of time the paint takes to dry and because the paint begins eroding immediately once the transparent overlay is applied which causes the shock pressure to the workpiece to be reduced once the laser is applied to the eroding paint.

SUMMARY OF THE INVENTION

The present invention provides a method of laser shock processing that can be used in a production environment that significantly reduces laser shock processing time and increases the effectiveness of the laser shock processing of the workpiece. The method begins with a step of applying an energy absorbing coating to the surface of the workpiece that is to be laser shock processed. In one form of the invention, an ultraviolet-curable resin, such as an ultraviolet-curing acrylic or urethane resin, is applied to the energy absorbing coating of the workpiece. The present invention is not necessarily limited to ultraviolet-curable resins, any type of curable resin can be used. A resin is cured when the resin becomes chemically inert or upon the polymerization of the resin. In one form, the ultraviolet-curable resin is exposed to an ultraviolet light which causes the curable resin to form a pellicle over the energy absorbing coating of the workpiece. The present invention is not limited to an ultraviolet light to form a pellicle or skin over the resin. The curing effect is determined by the type of resin used and the means of curing that resin. A transparent overlay, such as water, is applied in a thin flowing layer over the pellicular energy absorbing layer. When the transparent overlay has covered the energy absorbing layer of the workpiece, the laser is fired through the transparent overlay and onto the energy absorbing coating. After the laser has been fired, the remaining portion of the coating can be washed off of the surface of the workpiece using a high-speed jet of fluid. The entire sequence and event timing is controlled by an electronic processor. The sequence is repeated for each spot to be processed along the workpiece surface.

The invention, in one form thereof, comprises a method of laser shock processing the surface of a solid material. An energy absorbing coating is applied to a portion of the surface of the solid material. An ultraviolet-curable resin is applied to the coated portion of the solid material and the curable resin is exposed to an ultraviolet light and forms a pellicle over the energy absorbing coating. A transparent overlay material is applied to the pellicular portion of the energy absorbing coating. A pulse of coherent energy is directed to the energy absorbing coating of the solid material to create a shockwave.

The invention, in another form thereof, comprises a method of laser shock processing the surface of a solid material with or without the use of a transparent overlay material. An energy absorbing coating is applied to a portion of the surface of a solid material. An ultraviolet-curable resin coating is applied to the energy absorbing coating and the curable resin is exposed to an ultraviolet light and forms a pellicle over the energy absorbing coating. A pulse of coherent energy is directed to the energy absorbing coating of the solid material to create a shockwave.

The invention, in yet another form thereof, comprises a method of laser shock processing the surface of a solid material. An energy absorbing material is mixed with an ultraviolet-curable resin to form an energy absorbing mixture coating that is applied to the surface of the solid material. The mixture coating is exposed to an ultraviolet light and forms a pellicle over the mixture coating. A transparent overlay material is applied to the pellicular portion of the energy absorbing coating and a pulse of coherent energy is directed to the energy absorbing coated portion of the solid material to create a shockwave.

The invention, in still another form thereof, comprises a method of laser shock processing the surface of a solid material without the use of a transparent overlay material and using a mixture of the resin and the energy absorbing material. An energy absorbing material is mixed with an ultraviolet-curable resin to form an energy absorbing mixture coating that is applied to the surface of the solid material. The mixture coating is exposed to an ultraviolet light and forms a pellicle over the mixture coating and a pulse of coherent energy is directed to the energy absorbing coated portion of the solid material to create a shock wave.

The invention, in yet another form thereof, comprises a method of laser shock processing the surface of a solid material using a mixture consisting of a wet energy absorbing material and a resin. A wet energy absorbing material is mixed with an ultraviolet-curable resin to form an energy absorbing coating that is applied to the surface of the workpiece. The curable resin causes the wet energy absorbing coating to form a pellicle over once exposed to an ultraviolet light. A pulse of coherent energy is directed to the energy absorbing coated portion of the solid material to create a shockwave.

The invention, in still another form thereof, comprises an apparatus for laser shock processing the surface of a solid material. The apparatus includes a material applicator for applying an energy absorbing material onto the workpiece to create a coating on the workpiece. A curable resin applicator applies an ultraviolet curable resin onto the energy absorbing coating of the workpiece and a light applicator applies an ultraviolet light, to the curable resin. A transparent overlay applicator applies a transparent overlay to the energy absorbing coating of the workpiece. A laser provides a laser beam through the transparent overlay and to the energy absorbing coating to create a shock wave on the workpiece. A positioning mechanism is included to selectively position the workpiece relative to the material applicator, the curable resin applicator, the light applicator, the transparent overlay applicator, and the laser. Conversely, a positioning mechanism may position the material applicator, the curable resin applicator, the light applicator, and the transparent overlay applicator correctly over the spot on the workpiece to be treated while it is in position in the laser beam path. A control unit is operatively associated with each of the applicators, laser, and positioning mechanism to control the operation and the timing of each of the applicators, laser, and the selective operation of the positioning mechanism.

The invention, in yet another form thereof, comprises an apparatus for laser shock processing the surface of a solid material. The apparatus includes a material applicator for applying an energy absorbing material onto the workpiece, to create a coating on the workpiece. An ultraviolet curable resin applicator applies a curable resin to the energy absorbing coated portion of the workpiece end an ultraviolet light applicator applies an ultraviolet light to the curable resin. A laser provides a laser beam to the energy absorbing layer to create a shock wave on the workpiece. A positioning mechanism is included to selectively position the workpiece relative to the material applicator, curable resin applicator, light applicator, and the laser. Conversely, the positioning mechanism may position the material applicator, light applicator, and curable resin applicator correctly over the spot on the workpiece to be treated while it is in position in the laser beam path. A control unit is operatively associated with each of the applicators, laser, and positioning mechanism, to control the operation and the timing of each of the applicators, laser, and the selective operation of the positioning mechanism.

The invention, in still another form thereof, comprises an apparatus for laser shock processing the surface of a solid material. The apparatus includes a material applicator for applying a mixture of an energy absorbing material and an ultraviolet curable resin onto the workpiece to create a coated portion and a light applicator applies an ultraviolet light to the mixture. A transparent overlay applicator applies a transparent overlay to the energy absorbing mixture coating of the workpiece. A laser provides a laser beam through the transparent overlay and to the energy absorbing coating to create a shockwave on the workpiece. A positioning mechanism is included to selectively position the workpiece relative to the material applicator, light applicator, the transparent overlay applicator, and the laser. Conversely, a positioning mechanism may position the material applicator, the light applicator, and the transparent overlay applicator directly over the spot on the workpiece to be treated while it is in position in the laser beam path. A control unit is operatively associated with each of the applicators, laser, and positioning mechanism to control the operation and the timing of each of the applicators, laser, and the selective operation of the positioning mechanism.

The invention, in yet another form thereof, comprises an apparatus for laser shock processing the surface of a solid material. The apparatus includes a material applicator for applying a mixture of an energy absorbing material and an ultraviolet curable resin onto the workpiece to create a coated portion and a light applicator applies an ultraviolet light to the mixture. A laser provides a laser beam through the energy absorbing coating to create a shock wave on the workpiece. A positioning mechanism is included to position the workpiece relative to the material applicator, light applicator, and the laser. Conversely, the positioning mechanism may position the material applicator and light applicator over the spot on the workpiece to be treated while it is in position in the laser beam path. A control unit is operatively associated with each of the applicators, laser, and positioning mechanism to control the operation and the tinting of the applicators, laser, and the selective operation of the positioning mechanism.

An advantage of the present invention is that the method assists in erosion resistance of the energy absorbing coating once the transparent overlay is applied because the curable resin forms a pellicle over the energy absorbing coating and therefore delaying the erosion of the coating from the transparent overlay material. Prior laser shock processing methods have a problem in which, once the transparent overlay is applied to the energy absorbing coating, erosion of the energy absorbing coating takes place immediately and the coating has to be applied again. Having to re-apply the coating significantly increases the processing time.

Another advantage of the present invention is that the curable resin will form a pellicle over the energy absorbing coating in less than one second. Normally, it takes approximately ten minutes tar the energy absorbing coating to dry so that laser shock processing of the workpiece can occur. Using the fast curing resin, the wet paint is protected in less than one second, which increases the processing time significantly.

A further advantage of the present invention is that higher peak pressures of the shock wave to the workpiece can be achieved because the curable resin causes more of its energy absorbing coating to be left intact when the laser beam impacts the energy absorbing layer. Eliminating premature mixing of the energy absorbing coating with the transparent overlay allows for higher peak pressures of shock waves to the workpiece.

Yet another advantage of the present invention is that reduced power can now be used to achieve the same residual stress levels because previously, higher power was used to compensate for the erosion of the energy absorbing layer. Due to the fact that the curable resin assists in the resistance of the erosion to the energy absorbing layer, less power can be used to achieve the same results which will increase the life of the laser equipment.

Another advantage of the present invention is that by the curable resin forming a pellicle rather than becoming fully cured, the energy absorbing coating is more easily cleaned off the workpiece once the laser beam has been applied.

An advantage of the present invention is that the method assists in erosion resistance of the energy absorbing coating once the transparent overlay is applied because the curable resin forms a pellicle over the energy absorbing coating and therefore delaying the erosion of the coating from the transparent overlay material. Prior laser shock processing methods have a problem in which, once the transparent overlay is applied to the energy absorbing coating, erosion of the energy absorbing coating takes place immediately and the coating has to be applied again. Having to re-apply the coating significantly increases the processing time.

Another advantage of the present invention is that the curable resin will form a pellicle over the energy absorbing coating in less than one second. Normally, it takes approximately ten minutes for the energy absorbing coating to dry so that laser shock processing of the workpiece can occur. Using the fast curing resin, the wet paint is protected in less than one second, which increases the processing time significantly.

A further advantage of the present invention is that higher peak pressures of the shock wave to the workpiece can be achieved because the curable resin causes more of its energy absorbing coating to be left intact when the laser beam impacts the energy absorbing layer. Eliminating premature mixing of the energy absorbing coating with the transparent overlay allows for higher peak pressures of shock waves to the workpiece.

Yet another advantage of the present invention is that reduced power can now be used to achieve the same residual stress levels because previously, higher power was used to compensate for the erosion of the energy absorbing layer. Due to the fact that the curable resin assists in the resistance of the erosion to the energy absorbing layer, less power can be used to achieve the same results which will increase the life of the laser equipment.

Another advantage of the present invention is that by the curable resin forming a pellicle rather than becoming fully cured, the energy absorbing coating is more easily cleaned off the workpiece once the laser beam has been applied.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

To laser shock process a material, an energy absorbing coating is applied to the surface of the material. An overlay layer is then applied to the coated surface of the material. As the overlay layer is applied to the energy absorbing coating, the energy absorbing coating starts immediately eroding.

This is the problem the present invention solves by applying a curable resin to the energy absorbing coating. There are different ways of curing resins. Light can be used to cure resins. In particular, an ultraviolet light can be used to cure ultraviolet curable resins. Examples of ultraviolet curable resins include LIGHT WELL, MULTI-CURE, SURE CURE, and DARK CURE available from Dymax, Inc. of Torrington, Conn. Other examples of ultraviolet curable resins include a clear ultraviolet coating (product no. 62875) and a black ultraviolet coating (product no. 72256) available from UV Coatings Limited, 140 Sheldon Road, Berea, Ohio 44017. Flash heated (thermally-cured) resin coatings or coatings cured by chemical catalysis (e.g., amine gas-curing, aerobic or anaerobic curing resins) are other ways of curing resins.

The curable resin can be mixed with graphite or black iron oxide to create an energy absorbing paint. The curable resin can be a solid polymer as well. Also, the resin can have different viscosities.

In the preferred embodiment of the present invention, an ultraviolet-curable resin is applied to the energy absorbing coating and the resin is less than halfway cured to form a pellicle over the energy absorbing coating by exposing the resin to an ultraviolet light source to increase the resistance to erosion of the energy absorbing coating once the transparent overlay material is applied. The resin can be less than halfway cured, halfway cured or more than halfway cured to form a pellicle over the energy absorbing coating.

The curable resin can be mixed with graphite or black iron oxide to create an energy absorbing paint. The curable resin can be a solid polymer as well. Also, the resin can have different viscosities.

In the preferred embodiment of the present invention, an ultraviolet-curable resin is applied to the energy absorbing coating and the resin is less than halfway cured to form a pellicle over the energy absorbing coating by exposing the resin to an ultraviolet light source to increase the resistance to erosion of the energy absorbing coating once the transparent overlay material is applied. The resin can be less than halfway cured, halfway cured or more than halfway cured to form a pellicle over the energy absorbing coating.

Figure 2:
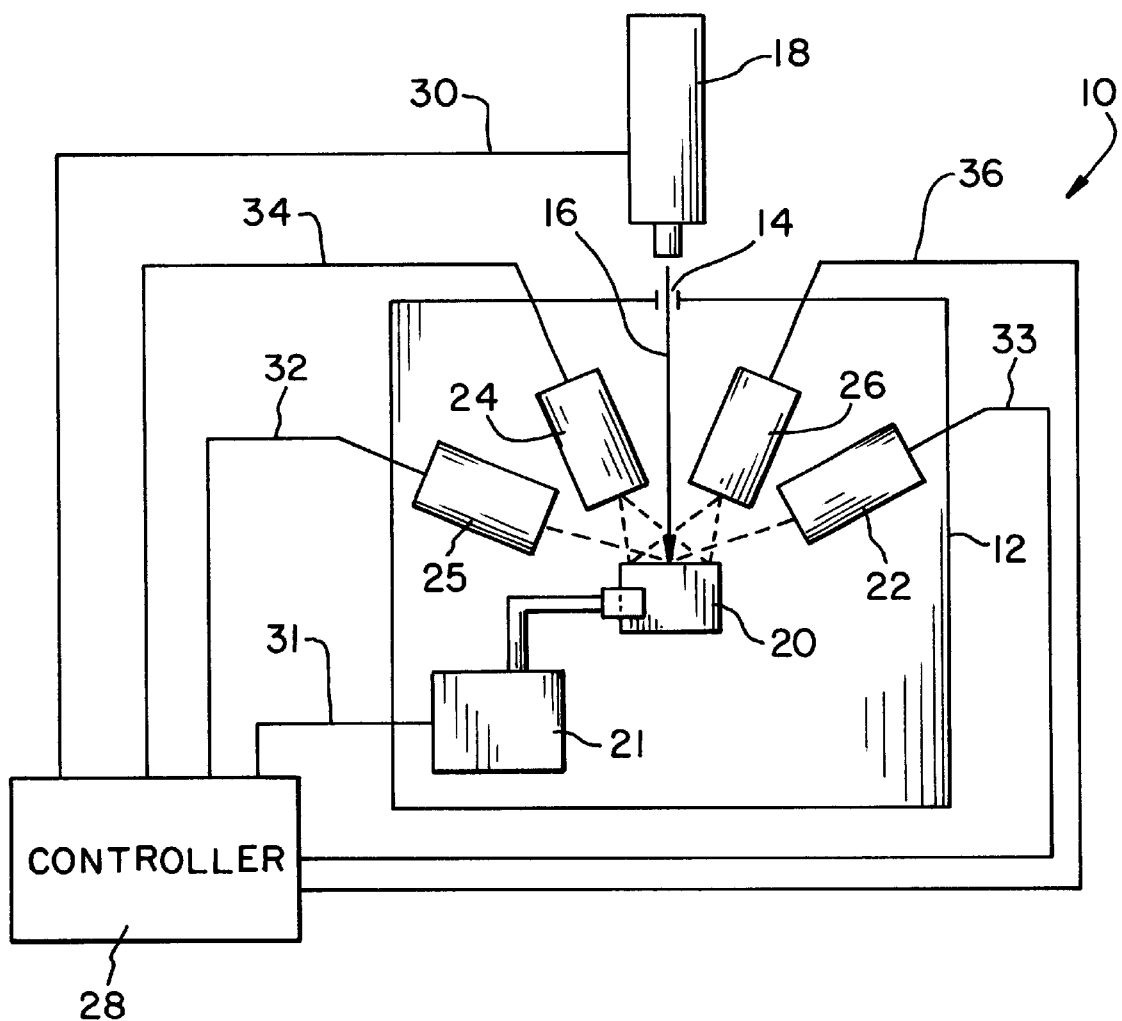
FIG. 2 is a diagrammatic view of another form of the present invention.

Referring now to the drawings, and particularly to FIG. 2, there is shown a preferred embodiment 10 of the present invention including a laser shock processing chamber 12 in which the laser shock process takes place. The laser shock processing chamber 12 includes an opening 14 for a laser beam 16 created by laser 18, a source of coherent energy. The laser pulse length and focus of the laser beam 16 may be adjusted as known in the art. Shown in FIG. 2, a workpiece 20 is held in position within laser shock processing chamber 12 by means of a positioning mechanism 21. Positioning mechanism 21 may be of the type of a robotically controlled arm or other apparatus to precisely position workpiece 20 relative to the operational elements of laser shock system 10.

System 10 includes a material applicator 24 for applying an energy absorbing material onto workpiece 20 to create a coated portion. The material utilized by material applicator 24 is an energy absorbing material, preferably that of a black paint such as those sold under the trade names of ZYNOLYTE BAR-B-Q or ZYNOLYTE STOVE COAT BLACK, available from Saria International, Inc. of San Carlos, Calif., but other energy absorbing materials may be used.

Another component of system 10 is a curable resin applicator 22 for applying an ultraviolet-curable resin onto the energy absorbing coating applied to workpiece 20. The curable resin can be applied when the energy absorbing coating is wet or dry.

System 10 also includes a light applicator 25 for applying light energy, for example an ultraviolet light to the ultraviolet curable resin. The light applicator may be manufactured using fiberoptic cable. The light emitted from light applicator 25 in one form is an ultraviolet light. The light emitted from light applicator 25 can have a wavelength in the range of 100 nm to 450 nm and an amplitude in the range of 1 W/cm$^2$ to 60 W/cm$^2$ if the curable resin can be cured using a light having a wavelength and amplitude in those ranges. These ranges of light parameters are examples of light parameters that can be used to cause the curable resin to become cured although others may be utilized depending on the equipment and the resin.

System 10 further includes a transparent overlay applicator 26 that applies a transparent overlay onto the portion of workpiece 20 coated by material applicator 24 and curable resin applicator 22. The transparent overlay material should be substantially transparent to the radiation from laser beam 16.

As shown in FIG. 2, the material applicator 24, the curable resin applicator 22, the light applicator 25, and the transparent overlay applicator 26 are shown directly located within laser shock processing chamber 12. In a production operation environment, only the necessary operative portions need to be located through and within laser shock processing chamber 12, such as the portion through which the materials actually flow through a flow head. The supply tanks for the applicators may be located outside of laser shock processing chamber 12.

A control unit, such as controller 28 is operatively associated with each of the material applicator 24, curable resin applicator 22, light applicator 25, transparent overlay applicator 26, laser 18, and positioning mechanism 21. Controller 28 controls the operation in timing of each of the applicators 24, 22, 25, 26, laser 18, and selective operation of positioning mechanism 21 to ensure proper sequence and timing of system 10. As shown in FIG. 2, controller 28 is connected to laser 18, positioning mechanism 21, light applicator 25, curable resin applicator 22, material applicator 24, and transparent overlay applicator 26 via control lines 30, 31, 32, 33, 34, and 36 respectively. Controller 28 may be a programmable personal computer.

Figure 1:
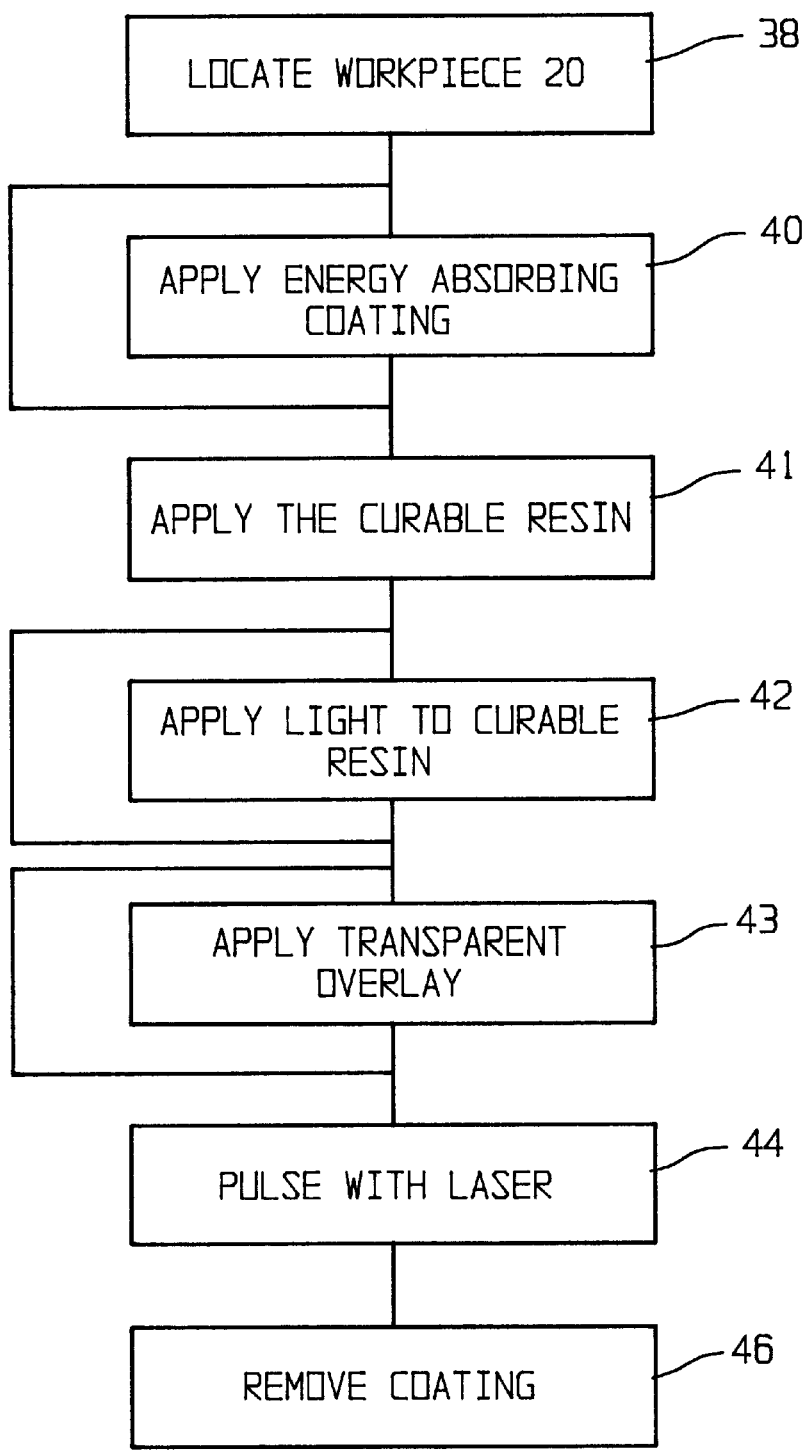
FIG. 1 is a flow chart of the method of one form of the present invention.

In operation, controller 28 controls operation of system 10 once initiated. As shown in FIG. 1, the method of the invention is that first, workpiece 20 is located (38) particularly within targeting chamber 12 by positioning mechanism 21. Controller 28 activates material applicator 24 to apply an energy absorbing coating (40) onto a particular location of workpiece 20 to be laser shock processed. The next step of the process is that controller 28 causes the curable resin applicator 22 to apply a curable resin (41) to the coated portion of the workpiece 20. A light is applied (42) to the curable resin to cause the curable resin to form a pellicle over the energy absorbing coated portion of workpiece 20. The next step of the process is that controller 28 causes the transparent overlay applicator 26 to apply a transparent overlay (43) to the pellicular energy absorbing coated portion of workpiece 20. At this point, laser 18 is immediately fired (44) by controller 28 to initiate a laser beam 16 to impact workpiece 20 through the transparent overlay and pellicular portion of the energy absorbing coating on workpiece 20. By directing this pulse of coherent energy to the energy absorbing coated portion, a shockwave is created. As the plasma expands from the impact area, it creates a compressional shockwave passing through and against workpiece 20.

The above-described process or portions of the process are repeated to shock process the desired surface area of workpiece 20. Depending upon the energy levels and the amount of laser shocking desired on workpiece 20, controller 28 may position or re-index workpiece 20 into another position using positioning mechanism 21 so that system 10 may apply coatings to and laser beam 16 may impact a different portion which can overlap the previous impact area. After laser beam 16 impacts the energy absorbing coated portion (44) of workpiece 20, it may be necessary to remove the remaining energy absorbing coating from workpiece 20. This additional step is referred to as (46) of FIG. 1. This step may be accomplished by a high speed jet of fluid to forcibly remove the remaining coating from workpiece 20.

The present invention has three other embodiments. The first embodiment eliminates the need for the traditional flowing transparent overlay. The second embodiment combines the ultraviolet curable resin and the energy absorbing material so that only one applicator is needed to apply the coating to the workpiece. The third embodiment not only eliminates the need for the traditional flowing transparent overlay, but also combines the ultraviolet curable resin and the energy absorbing material so only one applicator is needed to apply the coating to the workpiece.

In another form of the present invention, workpiece 20 is located (38) particularly within targeting chamber 12 by positioning mechanism 21. Controller 28 activates material applicator 24 to apply an energy absorbing coating (40) onto a particular location of workpiece 20 to be laser shock processed. The next step of the process is that controller 28 causes the curable resin applicator 22 to apply for example an ultraviolet-curable resin (41) to the energy absorbing coating applied to workpiece 20. The light applicator 25 applies an ultraviolet light (42) to the curable resin in order to form a pellicle over the energy absorbing coating. Laser 18 is immediately fired (44) by controller 28 to initiate a laser beam 16 to impact workpiece 20 through the pellicular portion of the energy absorbing coating on workpiece 20. By directing this pulse of coherent energy to the energy absorbing coated portion, a shockwave is created. As the plasma expands from the impact area, it creates a compressionable shockwave passing through and against workpiece 20. The workpiece can then be cleaned by having a high speed jet of fluid applied to its surface to remove the remaining energy absorbing coating (46).

In yet another form of the present invention, the workpiece 20 is located (38) particular within targeting chamber 12 by positioning mechanism 21. The energy absorbing material is mixed with an ultraviolet-curable resin and material applicator 24 applies that mixture (40) to coat workpiece 20. The light applicator 25 applies an ultraviolet light (42) to the coating in order to form a pellicle over the mixture. Controller 28 causes the transparent overlay applicator 26 to apply a transparent overlay (43) to the pellicular energy absorbing coated portion of the workpiece 20. Laser 18 is immediately fired (44) by controller 28 to initiate a laser beam 16 to impact workpiece 20 through the transparent overlay and pellicular portion of the energy absorbing coating on workpiece 20. By directing this pulse of coherent energy to the energy coated portion, a shockwave is created. As the plasma expands from the impact area, it creates a compressional shockwave passing through and against workpiece 20.

In another form of the present invention, the workpiece 20 is located (38) particularly within targeting chamber 12 by positioning mechanism 21. The energy absorbing material is mixed with an ultraviolet-curable resin and material applicator 24 applies that mixture (40) to coat workpiece 20. The light applicator 25 applies an ultraviolet light (42) to the coating in order to form a pellicle over the mixture. Laser 18 is immediately fired (44) by controller 28 to initiate a laser beam 16 to impact workpiece 20 through the pellicular mixture coating on workpiece 20. By directing this pulse of coherent energy to the mixture coated portion, a shockwave is created. As the plasma expands from the impact area, it creates a compressionable shockwave passing through and against workpiece 20. After the pulse of coherent energy, a high speed jet of fluid can be used to clean workpiece 20 by removing the remaining mixture coating (46).

Depending upon the workpiece material, many parameters of the present invention may be selected to control the shock process. For example, the operator controller may select a particular laser, a particular laser pulse energy, laser pulse time, number of laser pulses, focal lens, working distance, thickness of the energy absorbing coating, curable resin, and transparent overlay to control the laser shock process. More particularly, laser pulse energy and laser pulse width directly effect the cycle. The amount of energy placed on the surface of the workpiece and number of laser pulses effects the depth of each shock and the speed of the shocking process. It has been found that the energy of the laser pulse as well as other parameters should be controlled in order to prevent surface irregularities of the workpiece.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of laser shock processing, comprising:
    applying a curable resin coating to a portion of a surface of a solid material;
    applying a transparent overlay material to said curable resin coated portion of the solid material; and
    directing a pulse of coherent energy to said coated portion of the solid material to create a shockwave.

2. The method of claim 1 in which after said pulse of coherent energy is directed to said coated portion of the solid material, a high-speed jet of fluid is directed to said surface of the solid material to clean a portion of said surface of the solid material.

3. The method of claim 1 further comprising applying light to said curable resin.

4. The method of claim 1 in which said method is repeated to another portion of said surface of the solid material.

5. The method of claim 3 in which said light is ultraviolet and said curable resin is cured when exposed to said ultraviolet light.

6. The method of claim 1 further comprising applying an energy absorbing coating.

7. The method of claim 1 in which said transparent overlay material is water.

8. The method of claim 2 in which all of the steps are controlled by an electronic processor.

9. The method of claim 1 in which the pulse of coherent energy is provided by a laser.

10. The method in claim 3 in which said light has a wavelength in the range of 100 nm to 450 nm and an amplitude in the range of 1 W/cm$^2$ to 60 W/cm$^2$.

11. The method in claim 1 in which said curable resin is cured in less than one second.

12. The method of claim 6 in which said curable resin is less than halfway cured to form a pellicle over said energy absorbing coating before applying said transparent overlay material.

13. A method of laser shock processing, comprising:
    applying an energy absorbing coating to a portion of a surface of a solid material;
    applying a curable resin coating to said energy absorbing coating; and
    directing a pulse of coherent energy to said energy absorbing coated portion of the solid material to create a shockwave.

14. The method of claim 13 in which after said pulse of coherent energy is directed to said coated portion of the solid material, a high-speed jet of fluid is directed to said surface of the solid material to clean a portion of said surface of the solid material.

15. The method of claim 13 further comprising applying light to said curable resin.

16. The method of claim 13 in which said method is repeated to another portion of said surface of the solid material.

17. The method of claim 15 in which said light is ultraviolet and said curable resin is cured when exposed to said ultraviolet light.

18. The method of claim 13 in which said energy absorbing coating is paint.

19. The method of claim 13 in which said curable resin is a solid polymer.

20. The method of claim 14 in which all of the steps are controlled by an electronic processor.

21. The method of claim 13 in which the pulse of coherent energy is provided by a laser.

22. The method in claim 15 in which said light has a wavelength in the range of 100 nm to 450 nm and an amplitude in the range of 1 W/cm$^2$ to 60 W/cm$^2$.

23. The method in claim 13 in which said curable resin is cured in less than one second.

24. The method in claim 13 in which said curable resin is less than halfway cured to form a pellicle over said energy absorbing coating before directing said pulse of coherent energy to said energy absorbing coating.

25. A method of laser shock processing, comprising:
    mixing an energy absorbing coating with a curable resin to form a mixture coating;
    applying said mixture coating to a portion of a surface of a solid material;
    applying a transparent overlay material to said mixture coated portion of the solid material; and
    directing a pulse of coherent energy to said mixture coated portion of the solid material to create a shockwave.

26. The method of claim 25 in which after said pulse of coherent energy is directed to said coated portion of the solid material, a high-speed jet of fluid is directed to said surface of the solid material to clean a portion of said surface of the solid material.

27. The method of claim 25 further comprising applying light to said curable resin.

28. The method of claim 25 in which said method is repeated to another portion of said surface of the solid material.

29. The method of claim 27 in which said light is ultraviolet and said curable resin is cured when exposed to said ultraviolet light.

30. The method of claim 25 in which said energy absorbing coating is paint.

31. The method of claim 25 in which all of the steps are timed and controlled by an electronic processor.

32. The method of claim 25 in which the pulse of coherent energy is provided by a laser.

33. The method in claim 27 in which said light has a wavelength in the range of 100 nm to 450 nm and an amplitude in the range of 1 W/cm$^2$ to 60 W/cm$^2$.

34. The method in claim 25 in which said curable resin is cured in less than one second.

35. The method of claim 25 in which said curable resin is less than halfway cured to form a pellicle over said energy absorbing coating before directing said pulse of coherent energy to said energy absorbing coating.

36. A method of laser shock processing, comprising:
mixing an energy absorbing coating with a curable resin to form a mixture coating;
applying said mixture coating to a portion of a surface of a solid material; and
directing a pulse of coherent energy to said mixture coated portion of the solid material to create a shockwave.

37. The method of claim 36 in which after said pulse of coherent energy is directed to said coated portion of the solid material, a high-speed jet of fluid is directed to said surface of the solid material to clean a portion of said surface of the solid material.

38. The method of claim 36 further comprising applying light to said curable resin.

39. The method of claim 36 in which said method is repeated to another portion of said surface of the solid material.

40. The method of claim 38 in which said light is ultraviolet and said curable resin is cured when exposed to said ultraviolet light.

41. The method of claim 36 in which said energy absorbing coating is paint.

42. The method of claim 37 in which all of the steps are timed and controlled by an electronic processor.

43. The method of claim 36 in which the pulse of coherent energy is provided by a laser.

44. The method in claim 38 in which said light has a wavelength in the range of 100 nm to 450 nm and an amplitude in the range of 1 W/cm$^2$ to 60 W/cm$^2$.

45. The method in claim 36 in which said curable resin is cured in less than one second.

46. The method of claim 36 in which said curable resin within said coating mixture is less than halfway cured to form a pellicle over said energy absorbing coating before directing said pulse of coherent energy to said energy absorbing coating.

47. A method of laser shock processing, comprising:
mixing a wet energy absorbing coating with a curable resin to form a mixture coating;
applying said mixture coating to a portion of a surface of a solid material; and
directing a pulse of coherent energy to said mixture coated portion of the solid material to create a shockwave.

* * * * *